United States Patent
O'Donnell et al.

(10) Patent No.: US 12,453,586 B2
(45) Date of Patent: Oct. 28, 2025

(54) BONE REDUCTION AND PLATE FIXATION FORCEPS

(71) Applicant: Turlough O'Donnell, Dublin (IE)

(72) Inventors: Turlough O'Donnell, Dublin (IE); Malcolm O'Kelly, Dublin (IE)

(*) Notice: Subject to any disclaimer, the term of this patent is extended or adjusted under 35 U.S.C. 154(b) by 98 days.

(21) Appl. No.: 18/002,147

(22) PCT Filed: Jun. 22, 2021

(86) PCT No.: PCT/EP2021/067046
§ 371 (c)(1),
(2) Date: Dec. 16, 2022

(87) PCT Pub. No.: WO2021/259957
PCT Pub. Date: Dec. 30, 2021

(65) Prior Publication Data
US 2023/0218324 A1   Jul. 13, 2023

(30) Foreign Application Priority Data

Jun. 22, 2020  (GB) .................................. 2009483
Dec. 1, 2020  (GB) .................................. 2018936

(51) Int. Cl.
*A61B 17/80*    (2006.01)
*A61B 17/28*    (2006.01)

(52) U.S. Cl.
CPC .......... *A61B 17/8019* (2013.01); *A61B 17/28* (2013.01); *A61B 17/8004* (2013.01); *A61B 17/808* (2013.01)

(58) Field of Classification Search
CPC ..... A61B 17/28; A61B 2017/28; A61B 17/29; A61B 2017/29; A61B 17/80;
(Continued)

(56) References Cited

U.S. PATENT DOCUMENTS 1,985,108 A   12/1934  Rush
2,460,470 A   2/1949   Perry
(Continued)

FOREIGN PATENT DOCUMENTS

CN    106388925 A  *  2/2017
CN    108013927 A     5/2018
(Continued)

OTHER PUBLICATIONS

International Search Report in corresponding Application No. PCT/EP2021/067046, dated Oct. 8, 2021.

*Primary Examiner* — Larry E Waggle, Jr.
(74) *Attorney, Agent, or Firm* — Bookoff McAndrews, PLLC

(57) ABSTRACT

A bone reduction and plate fixation forceps including a first arm-having a proximal part including a handle and a bifurcated distal part in which a first bone engaging jaw and second bone engaging jaw are configured to engage a first surface of a fractured bone on each side of the fracture, and a second arm having a proximal part including a handle and a distal part comprising a third bone engaging jaw configured to engage a second surface of the fractured bone to clamp the bone between the first and second arm. At least one of the first bone engaging jaws and second bone engaging jaws has a proximal to distal bridge shape.

18 Claims, 13 Drawing Sheets

(58) Field of Classification Search
CPC ............ A61B 17/8004; A61B 17/8019; A61B 17/808; A61B 17/8866; A61B 17/8872
See application file for complete search history.

(56) References Cited

U.S. PATENT DOCUMENTS

| | | | |
|---|---|---|---|
| 10,201,891 B2 * | 2/2019 | Williams | ................ B25B 5/163 |
| 11,123,125 B2 * | 9/2021 | Chang | .................. A61B 17/808 |
| 2015/0100080 A1 | 4/2015 | Kohler | |

FOREIGN PATENT DOCUMENTS

| | | | | |
|---|---|---|---|---|
| CN | 217338801 U | * | 9/2022 | |
| GB | 2576187 A | * | 2/2020 | ......... A61B 17/0482 |

* cited by examiner

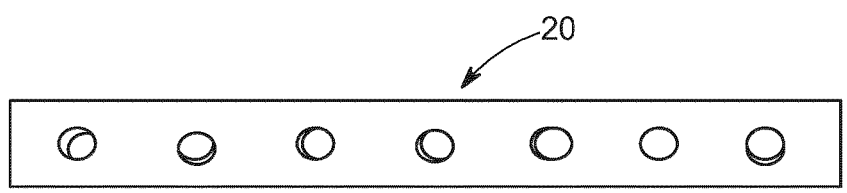 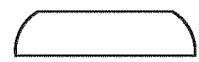
FIG. 15A FIG. 15B
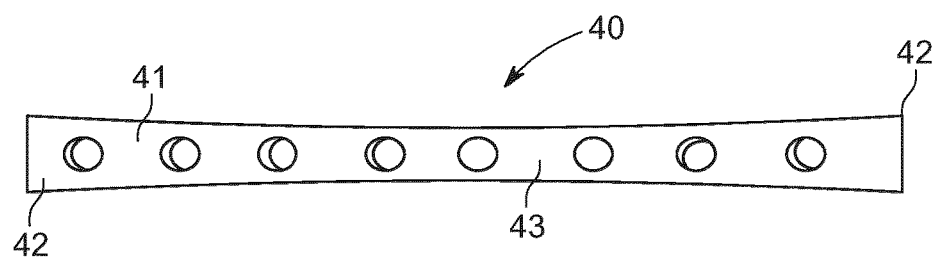 
FIG. 16A FIG. 16B

BONE REDUCTION AND PLATE FIXATION FORCEPS

FIELD OF THE INVENTION

The present invention relates to a bone reduction and plate fixation forceps. The invention also relates to a method of fixing a bone fixation plate to a fractured bone.

BACKGROUND TO THE INVENTION

Transverse fractures of bone are common. They typically occur in the shaft of the humerus, femur, radius, ulna, and metacarpal and metatarsal bones. They are characterized by a crack that extends across the bone, generally orthogonal to a longitudinal axis of the bone (FIG. 1).

These are inherently unstable fractures, and while non-surgical management can be employed if there is no displacement of the fragments, there is not enough stability to allow for early mobilization of the limb. Therefore, these fractures are often surgically fixed, using either intramedullary nail (IMN) technique, or open reduction internal fixation (ORIF) using dynamic compression or locking plates.

IMN is a straightforward technique that is commonly employed in the humerus and especially the femur, and involves placement of an intermedullary nail through the medullary cavity of a bone. However, IMN does not allow for anatomical reduction of fracture fragments, and especially in the humerus, many surgeons prefer ORIF using plates, as the fracture has more chance of healing. In addition, plating is generally less expensive, and from a health economics perspective, for this reason, many institutions globally advocate plating.

Plating transverse fractures is difficult; trying to reduce the fragments and hold them reduced while the plate is applied is very difficult, as conventional methods such as temporary wire fixation or lag screw fixation are simply impossible. Bone reduction forceps are known and are generally scissors-like in that they comprise two arms pivotally attached to each other, one end of each arm generally includes a finger or palm engaging loop or handle, and the other end of the arms include counter-facing a bone-engaging jaws that are used to grasp the bone fragments. However, it is not possible to hold the fragments reduced with conventional bone reduction forceps as the bone-engaging jaws of the forceps prevent the application of a fixation plate to the bone when the forceps is holding the bone in a reduced position.

It is an object of the invention to overcome at least one of the above-referenced problems.

It is a particular object of the invention to provide a bone reduction forceps that can hold the reduced bone in a reduced position while a bone fixation plate is fixed to the bone in an ORIF procedure.

SUMMARY OF THE INVENTION

The Applicant has addressed the problems of the prior art by providing a bone reduction and plate fixation forceps, capable of holding bone fragments in a reduced position while a bone fixation plate is fixed to the bone in an ORIF procedure. This is achieved by using a forceps in which one of the arms has a bifurcated distal end with two spaced-apart bone engaging jaws, where one and preferably both of the jaws has a distal to proximal bridge shape that can grip the bone while simultaneously providing a plate-receiving recess that allows passage of a bone fixation plate along the surface of the bone under one and generally both of the bridge shaped jaw(s). In this way, the reduced bone can be fixed in the reduced position using the forceps, and the plate can be positioned on a surface of the bone by inserting it under the bridge-shaped jaw(s) and fixed to the bone while the forceps maintains the bone in the reduced position. The forceps may be, for example, a 3-point fixation or 4-point fixation forceps with the first arm having at least two bone-engaging jaws and the second arm having at least one bone-engaging jaw. The bridge shaped jaw may be dimensioned to allow passage of a bone fixation plate along the bone (i.e. the opposed jaw parts may be sufficiently spaced apart to accommodate the full width of the plate) or it may be narrower than the ends of the plate and require the plate to be tilted to allow passage under the bridge shaped jaw. In this embodiment, the plate may have an inwardly tapered portion intermediate its ends which is sufficiently narrow to allow the plate fit between the jaw parts when flush against the bone but is required to be tilted away from a bone surface to facilitate the wider ends of the plate fitting between opposed jaw parts of the jaw. In another aspect, the distal part of one of the first or second arm includes a joint allowing rotational movement of the distal part about an axis of the distal part of the arm (rotational joint) during bone reduction and fixation. This allows the jaws of the arm pivot and adjust to allow engagement with bones having a different bone diameter on each side of a fracture. In another aspect, the forceps is configured to allow detachable attachment of the bifurcated part of the distal part to the forceps. This allows different bifurcated parts to be used in a modular fashion depending on the procedure and the anatomy of the bone.

In a first aspect, the invention provides a bone reduction and plate fixation forceps, comprising:
  a first arm having a proximal part comprising a handle and a bifurcated distal part having a first fork part with a first bone engaging jaw and a second fork part with a second bone engaging jaw in which the first bone engaging jaw and second bone engaging jaw are configured to engage a first surface of a fractured bone on each side of a bone fracture; and
  a second arm having a proximal part comprising a handle and a distal part comprising a third bone engaging jaw configured to engage a second surface of the fractured bone to clamp the bone between the first and second arms,
  wherein the second arm is pivotally attached to the first arm by a first joint typically disposed between the respective handles and the respective bone-engaging jaws of the first and second arms.

At least one of the first bone engaging jaws and second bone engaging jaws typically has a proximal to distal bridge shape configured to allow during use passage of a bone fixation plate under the bridged shaped jaw when the jaw is engaged with the fractured bone.

Generally, both the first bone engaging jaw and second bone engaging jaw have a proximal to distal bridge shape configured to allow passage of a bone fixation plate under the bridged shaped jaws when the jaws are engaged with the fractured bone.

In any embodiment, the first fork part and second fork part diverge, typically at an angle of at least 30°, 40°, 50° or 60°. In any embodiment, the first fork part and second fork part diverge at an angle of greater than 70°, for example 70° to 120° or 80° to 100°.

In one embodiment, the distal part of the second arm is bifurcated and comprises a third fork part comprising the third bone engaging jaw and a fourth fork part comprising a fourth bone engaging jaw, in which the third bone engaging jaw and fourth bone engaging jaw are configured to engage the second surface of the fractured bone on each side of the fracture. This embodiment provides a 4-point fixation forceps.

In any embodiment, the third fork part and fourth fork part diverge, typically at an angle of at least 30°, 40°, 50° or 60°. In any embodiment, the third fork part and fourth fork part diverge at an angle of greater than 70°, for example 70° to 120° or 80° to 100°.

In one embodiment, the first bone engaging jaw and second bone engaging jaw are laterally spaced apart by a first distance D1.

In any embodiment, the third bone engaging jaw and fourth bone engaging jaw are laterally spaced apart by a second distance D2.

In any embodiment D1 is at least 50% greater than D2. Thus, the bone-engaging jaws of the first and second arms are generally not counter-facing, with the jaws of the first arm typically more spaced apart than the jaws of the second arm.

In one embodiment, D1 is about 4-8 cm, or about 5-7 cm.

In one embodiment, D2 is about 1-5 cm, or about 2-4 cm.

In one embodiment, the distal part of the first or second arm includes a joint allowing rotational movement of a distal end of the distal part about an axis of the distal part of the arm (e.g. a rotational joint). This allows the jaws of the arm pivot and adjust to allow engagement with bones having different diameter on each side of a fracture, in a "see-saw" manner. It is illustrated in FIGS. 7 to 9. The joint is generally positioned at or proximal to where the distal arm bifurcates. Typically, the rotational joint is configured to allow limited rotational movement of a distal end of the distal part about an axis of the distal part of the arm, for example rotation about less than 120° or 100°, and generally rotation about 20°-100°, 50°-100° or 60°-80°.

When the distal part of both the first and second arms are bifurcated (e.g. when both arms are distally bifurcated), one of the distal parts will include a rotational joint, typically the distal part of the second arm, whereas the other distal part is generally rotationally fixed (e.g. will not include a rotational joint). Thus, the jaw or jaws on the other distal part act as an anchor.

When the distal part of the first arm is bifurcated and the distal part of the second arm is not bifurcated, the distal part of the first arm will include the rotational joint. Typically, the rotational joint is disposed on the distal part of the arm between the first joint (where the first and second arms pivotally connect) and a bifurcation point of the arm. Typically, the rotational joint is disposed on the distal part of the arm just proximally of the point of bifurcation.

In one embodiment, the first or second arm is configured to allow detachable engagement of the bifurcated part of the distal part from the forceps. Typically the first or second arm may be configured to allow detachable engagement of the bifurcated part of the distal part from the forceps at the rotational joint. This allows different bifurcated parts to be used in a modular fashion depending on the procedure and the anatomy of the bone. Thus, in one embodiment, the invention provides a kit comprising (a) a bone reduction and plate fixation forceps according to the invention and (b) one or more modular bifurcated distal parts configured for detachable engagement to one of the distal arms at a rotational joint.

In one embodiment, the bifurcated distal part of the second arm is detachably attachable to the second arm. In one aspect, the invention provides a modular kit comprising a forceps according to the invention and a plurality of modular bifurcated distal parts detachably attachable to the second arm to form the forceps of the invention. This allows a user choose a specific bifurcated distal part depending on the bone to be treated and the type of break or fracture to the bone. For example, the plurality of bifurcated distal parts may differ from each other in any one of a number of aspects, for example the distance between the bone-engaging jaw parts, the length of the forms, the distance between the jaws, the configuration of the jaws (e.g. bridging jaws, non-bridging jaws), or rotational or non-rotational bifurcated distal part.

In one embodiment, the first and/or second bone engaging jaws have an arcuate profile. This allows the jaws to curve around the first surface of the bone and engage the bone at spaced-apart points across the first surface.

In one embodiment, the at least one bridged shaped bone engaging jaw comprises a distal bone engaging jaw part connected to a proximal bone engaging jaw part by a raised bridging jaw part that defines a plate receiving recess (e.g. in use is spaced apart from the first surface of the bone providing a bone fixation plate receiving recess).

In one embodiment, the distal and proximal bone engaging jaw parts are configured such that in use they are circumferentially spaced apart around the first surface of the bone by about 50-120° (or about 1.5 to 5 cm or 2-4 cm).

In one embodiment, the distal bone engaging jaw part and proximal bone engaging jaw part are laterally spaced apart by a distance D1, wherein the raised bridging part is configured such that a distance D2 between one of the jaw parts and a top of the bridging part is greater than D1. This configuration allows a plate have ends with a width greater than D1 to be used with the forceps, where the plate can be passed under the bridge by tilting the plate upwardly and passing the wide end of the plate under the jaws in the tilted orientation when the jaws are clamped to the bone, and then placing the plate flush against the bone where it fits between the jaw parts due to the tapered central part of the plate. This is illustrated in FIGS. 13 and 14. In one aspect, the invention provides a forceps according to the invention and a plate having an inwardly tapered section.

In one embodiment, the plate receiving recess of the first and/or second jaws has a height of 0.3 to 7 cm, 1-6 cm, 2-5 cm, 3-5 cm or 0.3 to 1.5 cm.

In one embodiment, the bone engaging jaws comprise a plurality of teeth (for example, serrations or projections).

In one embodiment, the forceps includes a ratcheting mechanism (for example a ratcheting rack) attached to one of the first and second arms. In one embodiment, the forceps include counter-facing ratcheting racks to lock the two arms, relative to each other, and, thereby, maintain a force between the jaws of each arm to hold the bone fragments together after the forceps have been released from a surgeon's hand. Elastic deformation of the arms generally provides the force. In another embodiment, the forceps includes a leadscrew to maintain a set amount of force.

In another aspect, the invention provides a bone reduction and plate fixation forceps, comprising:
  a first arm having a proximal part comprising a handle and
    a bifurcated distal part having a first fork part with a
    first bone engaging jaw and a second fork part with a
    second bone engaging jaw in which the first bone
    engaging jaw and second bone engaging jaw are configured to engage a first surface of a fractured bone on each side of the fracture; and a second arm having a proximal part comprising a handle and a distal part comprising a third bone engaging jaw configured to engage a second surface of the fractured bone to clamp the bone between the first and second arms;

wherein the second arm is pivotally attached to the first arm by a first joint disposed between the respective handles and the respective bone-engaging jaws of the first and second arms, and wherein the distal part of the first or second arm includes a joint allowing rotational movement (typically limited rotational movement) of a distal end of the distal part of the arm about an axis of the distal part of the arm (e.g. a rotational joint).

In another aspect, the invention provides a bone reduction and plate fixation kit comprising:

a bone reduction and plate fixation forceps according to the invention; and a bone fixation plate configured for passage along a first surface of a fractured bone under the bridged shaped bone-engaging jaw of the bone reduction and plate fixation forceps when the jaw is engaged with the fractured bone.

In any embodiment, the bone fixation plate is a dynamic compression plate.

In any embodiment, the bone fixation plate is a transverse fracture bone fixation plate.

In any embodiment the bone fixation plate has a first end, second end, and an inwardly tapered central part intermediate the ends. In any embodiment, at least one end (and generally both ends) of the plate is wider than a spacing defined between the jaw parts of the first and/or second bone engaging jaws. This provides the plate with ends that are wider than the central part (i.e. it is waisted), allowing the central part abut the bone to be treated under the proximal to distal bridge shape jaws while having a wider profile at one or both ends for improved fixation to the bone. Often the ends of the plate are too wide to be passed along the bone under the proximal to distal bridge shape jaws, and in these circumstances the plate can be angled obliquely (e.g. tilted away from the bone surface) so that the end of the plate can be passed under the bridge-shaped jaws, and then returned to the bone abutting position when the narrower part of the plate is disposed under the bridge shaped jaws. This is illustrated in FIGS. 13 and 14.

In another aspect the invention provides a bone fixation plate, particularly a dynamic compression fixation plate, having an inwardly tapered central section. In one embodiment, the inwardly tapered central section has a width at its narrowest point that is at least 5%, 10%, 15%, 20% or 25% narrower than a width of the plate at it ends. In one embodiment, the inwardly tapered central section has a width at its narrowest point that is 5-30%, 10-30%, 15-30%, 15-25%, 18-22% or about 20% narrower than a width of the plate at it ends. In one embodiment, the plate has width at one or both ends of 12-18 mm (for example 13-17 mm or 14-16 mm) and a width at its narrowest point inwardly tapered central section of 9-15 mm (for example 10-14 mm or 11-13 mm). In one embodiment, the plate has holes for receipt of bone fixing screws, typically counter-sunk holes.

In another aspect, the invention provides a method of fixing a bone fixation plate to a first surface of a bone having a fracture, comprising the steps of:

at least partly reducing the bone fragments;

holding the bone fragments in the at least partly reduced configuration using a bone reduction and plate fixation forceps according to the invention;

passing a bone fixation plate along the first surface of the bone under the bridge-shaped jaws or jaws until the plate is positioned on a section of the first surface of the bone on each side of the fracture;

fixing the bone fixation plate to the bone while the bone reduction and plate fixation forceps holds the bone fragments in the reduced configuration; and releasing and removing the bone reduction and plate fixation forceps from the bone.

In any embodiment, the bone fracture is a transverse or spiral oblique fracture.

In any embodiment, the bone fracture is a fracture of the diaphysis.

In any embodiment, the fractured bone is a long bone selected from a radius, ulna, humerus, femur, tibia, fibula, metacarpal or metatarsal.

In one embodiment, the method includes the steps of:

partly reducing the bone fragments;

holding the bone fragments in the partly reduced configuration using the bone reduction and plate fixation forceps;

further reducing the bone fragments while the bone fragments are held in place with the bone reduction and plate fixation forceps; and adjusting the bone reduction and plate fixation forceps to fix the bone fragments in a fully reduced position.

In another aspect, the invention provides a method of fixing a bone fixation plate to a first surface of a bone having a transverse fracture that employs a bone reduction and plate fixation kit according to the invention, comprising the steps of:

at least partly reducing the bone fragments;

holding the bone fragments in the at least partly reduced configuration using a bone reduction and plate fixation forceps of the kit;

tilting the bone fixation plate upwardly and passing bone fixation plate in the tilted orientation under the jaws until the plate overlies a section of the first surface of the bone on each side of the fracture and the inwardly tapered central section of the plate is disposed under the bridge shaped jaws;

tilting the bone fixation plate downwardly to lie against the first surface of the bone;

fixing the bone fixation plate to the bone while the bone reduction and plate fixation forceps holds the bone fragments in the reduced configuration; and releasing and removing the bone reduction and plate fixation forceps from the bone.

Other aspects and preferred embodiments of the invention are defined and described in the other claims set out below.

BRIEF DESCRIPTION OF THE FIGURES

FIG. 15A and FIG. 15B are top plan and end elevational views, respectively, of a conventional bone fixation plate.

FIGS. 16A and 16B are top plan and end elevational views, respectively, of a plate according to the invention with an inwardly-tapered central section.

DETAILED DESCRIPTION OF THE INVENTION

Figure 1:
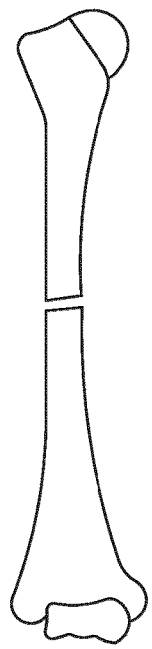
FIG. 1 illustrates a transverse Type A fracture of the humeral diaphysis.

All publications, patents, patent applications and other references mentioned herein are hereby incorporated by reference in their entireties for all purposes as if each individual publication, patent or patent application were specifically and individually indicated to be incorporated by reference and the content thereof recited in full.

Definitions and General Preferences

Where used herein and unless specifically indicated otherwise, the following terms are intended to have the following meanings in addition to any broader (or narrower) meanings the terms might enjoy in the art:

Unless otherwise required by context, the use herein of the singular is to be read to include the plural and vice versa. The term "a" or "an" used in relation to an entity is to be read to refer to one or more of that entity. As such, the terms "a" (or "an"), "one or more," and "at least one" are used interchangeably herein.

As used herein, the term "comprise," or variations thereof such as "comprises" or "comprising," are to be read to indicate the inclusion of any recited integer (e.g. a feature, element, characteristic, property, method/process step or limitation) or group of integers (e.g. features, element, characteristics, properties, method/process steps or limitations) but not the exclusion of any other integer or group of integers. Thus, as used herein the term "comprising" is inclusive or open-ended and does not exclude additional, unrecited integers or method/process steps.

As used herein, the term "proximal to distal" as applied to the bridge-shaped bone engaging jaw means that the jaw is configured to extend across the bone generally orthogonal to a longitudinal axis of the bone.

The term "bridge-shaped" as applied to a bone-engaging jaw means that the jaw has distal and proximal bone engaging jaw parts connected by a bridging jaw part that is configured to be spaced from the bone surface when the jaw is engaged with the bone providing a fixation plate receiving recess. Generally, the bridge-shaped jaw is configured such that the distal and proximal jaw parts are spaced apart by at least 2-5 cm, and the bridging jaw part has a height of at least 1-2 cm above the bone surface, to allow passing a fixing plate under the bridge shaped jaw when it is engaged with a bone.

The term "bifurcated" as applied to the distal part of the first or second arms means that the arm forks into two forks at a forking point. Generally, the forks diverge in a symmetrical manner. Typically, the forks are mirror images of each other. Although the embodiment described herein, show both first and second arms having a bifurcated distal part, it will be appreciated that the distal part of the second arm does not have to bifurcate, and may comprise a single arm with a done engaging jaw configured to span the fracture. Likewise, the invention is not restricted to first and/or second arms that are bifurcated, but may be embodied with an arm having a distal part that forks into three or more arms, depending on the application.

The term "bone fixation plate" refers to a plate used in orthopaedic surgery to attach to a fractured bone to provide structural support to the bone, keep the bone in an anatomically reduced position, and aid in the healing process. One example of a bone fixation plate is a dynamic compression plate. Generally, bone fixation plates include a number of holes that allow the plate to the fixed to the bone with screws. Often the holes are countersunk holes. The plate may be contoured to the shape of a specific bone. Generally, the plate is monoplanar. Examples of bone fixation plates include dynamic compression plates, locking plates, and combined locking compression-dynamic compression plates.

The term "handle" refers to formations on the proximal end of each arm, for example finger or palm engaging loop or handle that facilitate a surgeon holding and using the forceps.

The term "limited rotation" as applied to the rotational joint should be understood to mean that the rotational joint is not free to rotate fully about its axis of rotation but that rotation is limited to rotation about less than 120° or 100°, and generally rotation about 20°-100°, 50°-100° or 60°-80° about its axis of rotation.

In the context of treatment and effective amounts as defined above, the term subject (which is to be read to include "individual", "animal", "patient" or "mammal" where context permits) defines any subject, particularly a mammalian subject, for whom treatment is indicated. Mammalian subjects include, but are not limited to, humans, domestic animals, farm animals, zoo animals, sport animals, pet animals such as dogs, cats, guinea pigs, rabbits, rats, mice, horses, camels, bison, cattle, cows; primates such as apes, monkeys, orangutans, and chimpanzees; canids such as dogs and wolves; felids such as cats, lions, and tigers; equids such as horses, donkeys, and zebras; food animals such as cows, pigs, and sheep; ungulates such as deer and giraffes; and rodents such as mice, rats, hamsters and guinea pigs. In preferred embodiments, the subject is a human. As used herein, the term "equine" refers to mammals of the family Equidae, which includes horses, donkeys, asses, *kiang* and zebra.

Exemplification

The invention will now be described with reference to specific Examples. These are merely exemplary and for illustrative purposes only: they are not intended to be limiting in any way to the scope of the monopoly claimed or to the invention described. These examples constitute the best mode currently contemplated for practicing the invention.

Figure 2:
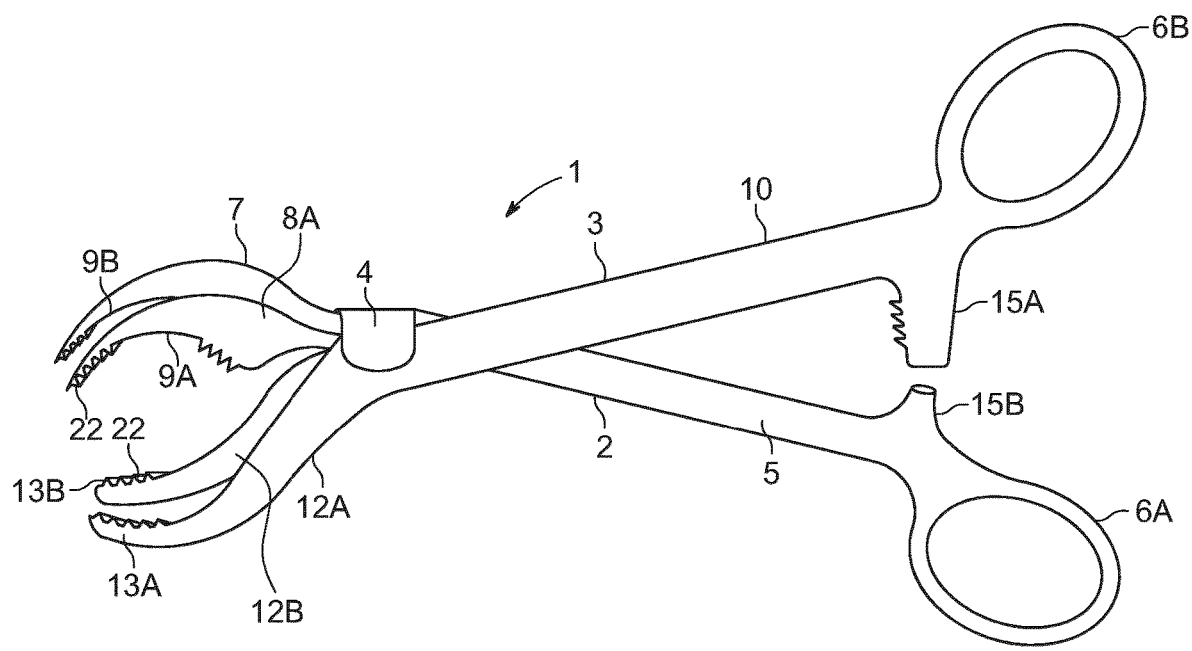
FIG. 2 is a side elevational view of a bone reduction and plate fixation forceps according to the invention shown from distal (right hand side) to proximal (left hand side).
Figure 3:
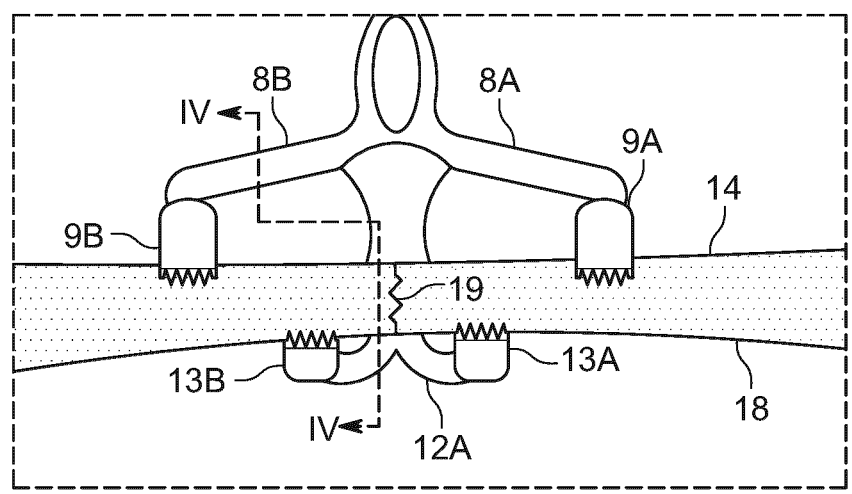
FIG. 3 is a front elevational view (looking in distal to proximal direction) of the bone reduction and plate fixation forceps of FIG. 2 shown attached to a humeral diaphysis with a transverse fracture.

Referring to the drawings, and initially to FIGS. 2 and 3, a bone reduction and plate fixation forceps is described, indicated generally by the reference numeral 1. The forceps comprises a first arm 2, second arm 3, and a pivot joint 4 providing pivoting scissors-like articulation of the arms.

The first arm 2 has a proximal section 5 with a handle 6A and a bifurcated distal end 7 with diverging forks 8A, 8B each terminated in a bone engaging jaw 9A, 9B. In use, the jaws 9A, 9B are used to grasp a first surface 14 of a fractured bone on each side of a fracture (as illustrated in FIG. 3). In the embodiment shown, the jaws 9A, 9B are laterally spaced apart by about 6 cm, although it will be appreciated that the spacing may be varied according to the bone being treated and the type of fracture.

The second arm 3 has a proximal section 10 with a handle 6B and a bifurcated distal end 11 with diverging forks 12A, 12B each terminated in a bone engaging jaw 13A, 13B. In use, the jaws 13A, 13B are used to grasp a second surface 18 of a fractured bone on each side of a fracture 19 (as illustrated in FIG. 3). In the embodiment shown, the jaws 13A, 13B are laterally spaced apart by about 3 cm, although it will be appreciated that the spacing may be varied according to the bone being treated and the type of fracture.

The pivot joint 4 is a conventional pivot joint used in orthopaedic forceps and will not be described in more detail.

The forceps 1 also includes a ratcheting mechanism comprising counter-facing ratcheting racks 15A, 15B to lock the two arms, relative to each other, and, thereby, maintain a force between the jaws of each arm to hold the bone fragments together after the forceps have been released from a surgeon's hand. Elastic deformation of the arms generally provides the force.

Figure 4:
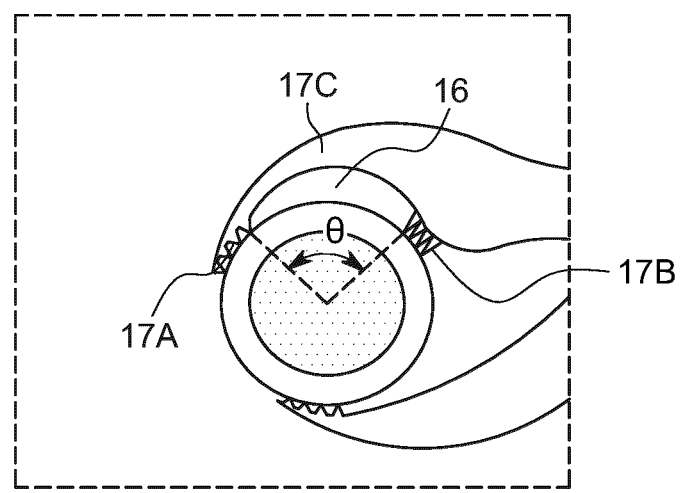
FIG. 4 is a sectional view taken along the lines IV-IV of FIG. 3 showing one of the bridge-shaped bone-engaging jaws of the first (upper) arm and one of the bone-engaging jaws of the second (lower) arm.
Figure 5:
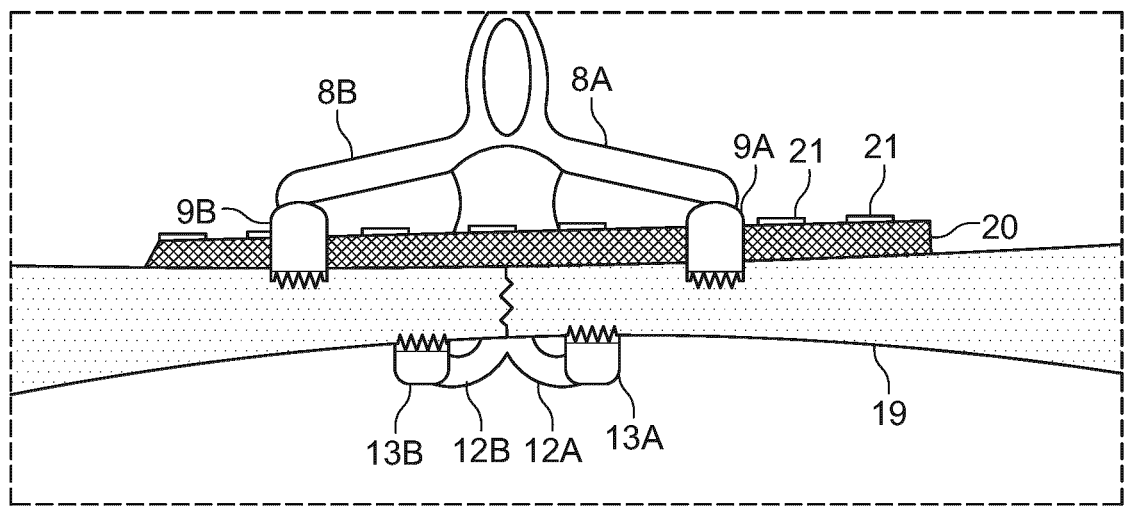
FIG. 5 is a front elevational view (looking in distal to proximal direction) of the bone reduction and plate fixation forceps of FIG. 2 shown attached to a humeral diaphysis with a transverse fracture, and with a dynamic compression plate fixed to the bone across the fracture while the forceps is clamped to the bone keeping the bone in the anatomically correct reduced position.

Referring to FIGS. 4 to 5, the bone engaging jaws 9A, 9B of the first arm 2 are described in more detail. As illustrated best in the sectional view of FIG. 4, the jaws have a distal to proximal (right to left in FIG. 4) bridge shape configured to grip the bone at spaced apart points across the first surface providing a recess 16 to receive a bone fixation plate when the jaws are engaged with the bone. The bridge shaped jaw comprises a distal jaw part 17A, a proximal jaw part 17B and an arcuate bridging jaw part 17C that define (along with the first surface of the bone during use) the plate-receiving recess 16. In the embodiment shown, the bridge-shaped jaw is configured such that during use the distal and proximal jaw parts are circumferentially spaced around the top surface at an angle of about 80° as shown in FIG. 4. In the embodiment shown, the recess has a height of about 1 cm.

Figure 6:
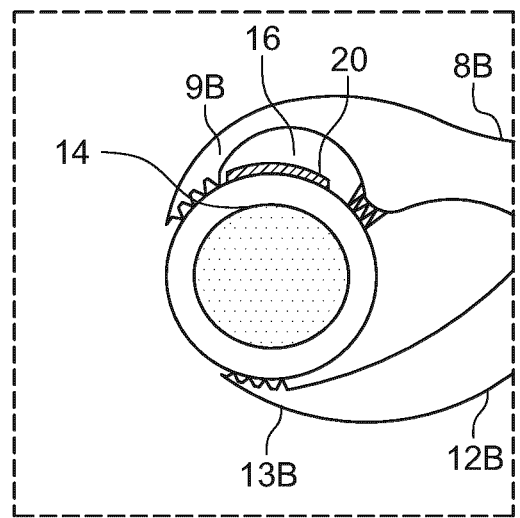
FIG. 6 is the same as FIG. 4 but illustrates the circumferential spacing angle of the distal and proximal jaw parts of the bridge-shaped jaw.

A dynamic compression bone fixation plate 20 is shown in FIGS. 4 to 6, which has been placed in position after the bone fragments have been reduced and fixed in a reduced position with the forceps 1, and then screwed to the bone across the fracture with screws 21. Although not illustrated, the recesses 16 may be dimensioned to allow passage of the fixing plate 20 under the bridging jaws in a tight but sliding manner, which will facilitate the bridge-shaped jaws maintain the plate in position while it is being screwed to the bone across the fracture. The plate 20 may also be contoured to fit in the recess and conform to the contours of the top surface of the bone.

The bone engaging surfaces of the jaws comprises a series of serrated teeth 22 to facilitate the forceps grasping the bone.

In use, the forceps of the invention may be used to hold a fractured bone in a reduced position while fixing a bone fixation plate to a first surface of the bone across the fracture. The process includes the steps of the surgeon (at least partly) reducing the bone fragments to an anatomically correct position, and holding the bone fragments in the at least partly reduced configuration using the bone reduction and plate fixation forceps as described above. As illustrated in FIG. 3, this leaves the first surface 14 of the bone on each side of the fracture exposed. The bone fixation plate 1 (a dynamic compression plate) is then passed along the first surface of the bone under the jaws 9A, 9B until the plate is positioned over a section of the first surface of the bone on each side of the fracture, as illustrated in FIG. 5. The surgeon can then fix the bone fixation plate to the bone while the bone reduction and plate fixation forceps holds the bone fragments in the reduced configuration. Fixing comprises drilling holes in the bone through holes in the plate, and then fixing the plate to the bone with screws 21. The holes in the plate may be countersunk holes. Once the plate has been screwed to the bone, the surgeon then releases and removes the forceps.

In some embodiment, the method may involve partly reducing the bone fragments; holding the bone fragments in the partly reduced configuration using a bone reduction and plate fixation forceps 1, further reducing the bone fragments while the bone fragments are held in place with the bone reduction and plate fixation forceps, and then adjusting the bone reduction and plate fixation forceps to fix the bone fragments in a fully reduced position.

Figure 7:
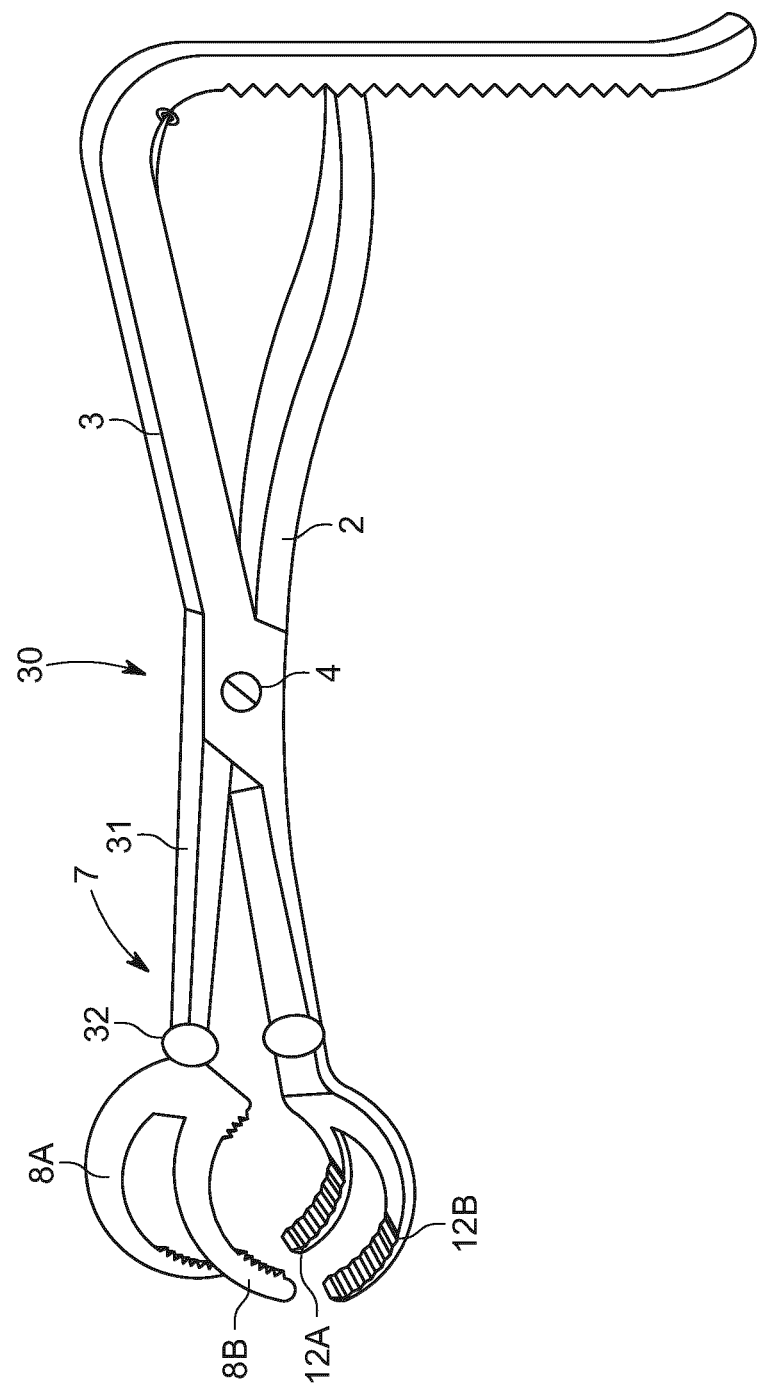
FIG. 7 is a side elevational view of a bone reduction and plate fixation forceps according to another embodiment of the invention and including a rotational joint on the distal part of the first arm just proximal of the point of bifurcation.
Figure 8:
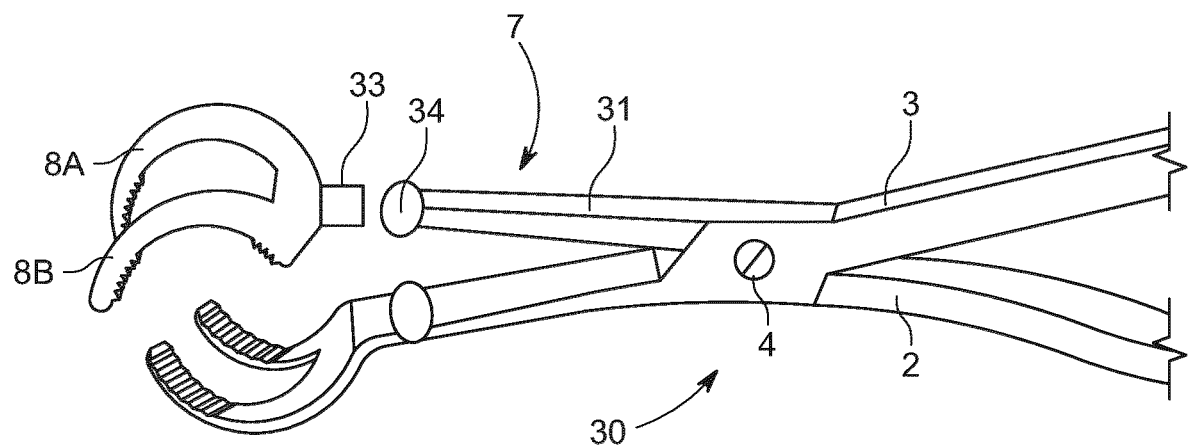
FIG. 8 is a side elevational view of the bone reduction and plate fixation forceps of FIG. 7 showing a modular jaws detached from the distal part of the first arm.
Figure 9:
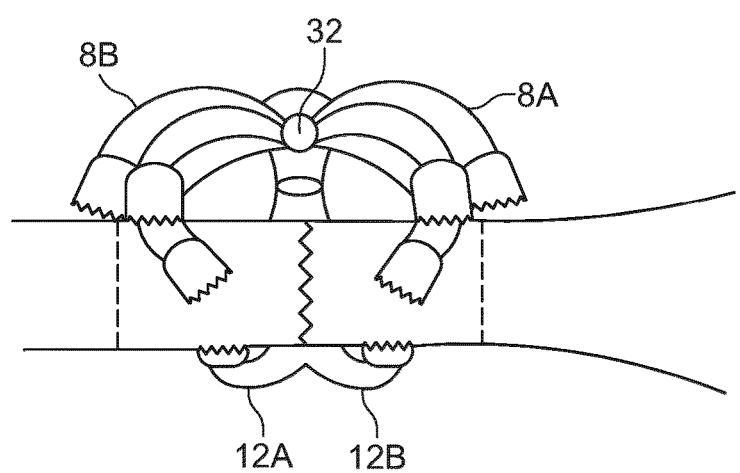
FIG. 9 is an elevational view of the bone reduction and plate fixation forceps on FIG. 7 shown showing the rotational movement of the jaws about a longitudinal axis of the distal part of the first arm allowing the jaws to rotate to adapt to a distance gradient across the fracture site.

Referring to FIGS. 7 to 9, an alternative embodiment of the forceps of the invention is illustrated, indicated generally by the reference numeral 30, in which parts described with reference to the previous embodiment are assigned the same reference numerals. In this embodiment, the bifurcated distal end 7 of the first arm 2 has a proximal shaft 31 and a bifurcated part including the forks 8A, 8B connected by a joint 32. The joint is a rotational joint, that allows the bifurcated part (e.g. forks 8A, 8B and jaws 9A, 9B pivot about a longitudinal axis of the shaft 31 allowing positional adjustment of the jaws to account for bones having a different diameter on opposite sides of a fracture site. FIG. 9 illustrates the positional adjustment of the jaws relative to a bone. The rotational joint may be any type of joint that allows this "see-saw" pivotal movement of the jaws relative to the forceps.

Referring to FIG. 8, the joint 32 may be configured to allow detachable engagement of the bifurcated part and may include a male part 33 on the bifurcated part configured for detachable engagement with a female part 34 on the shaft 31 (or vica-versa). In use, the rotational joint allows positional adjustment of the jaws when the jaws are applied to a bone to account for bones having a different diameter on opposite sides of a fracture site. In this embodiment, the jaw (or jaws) of the second arm are not rotationally adjustable and act as an anchor for the forceps on the bone.

Figure 10:
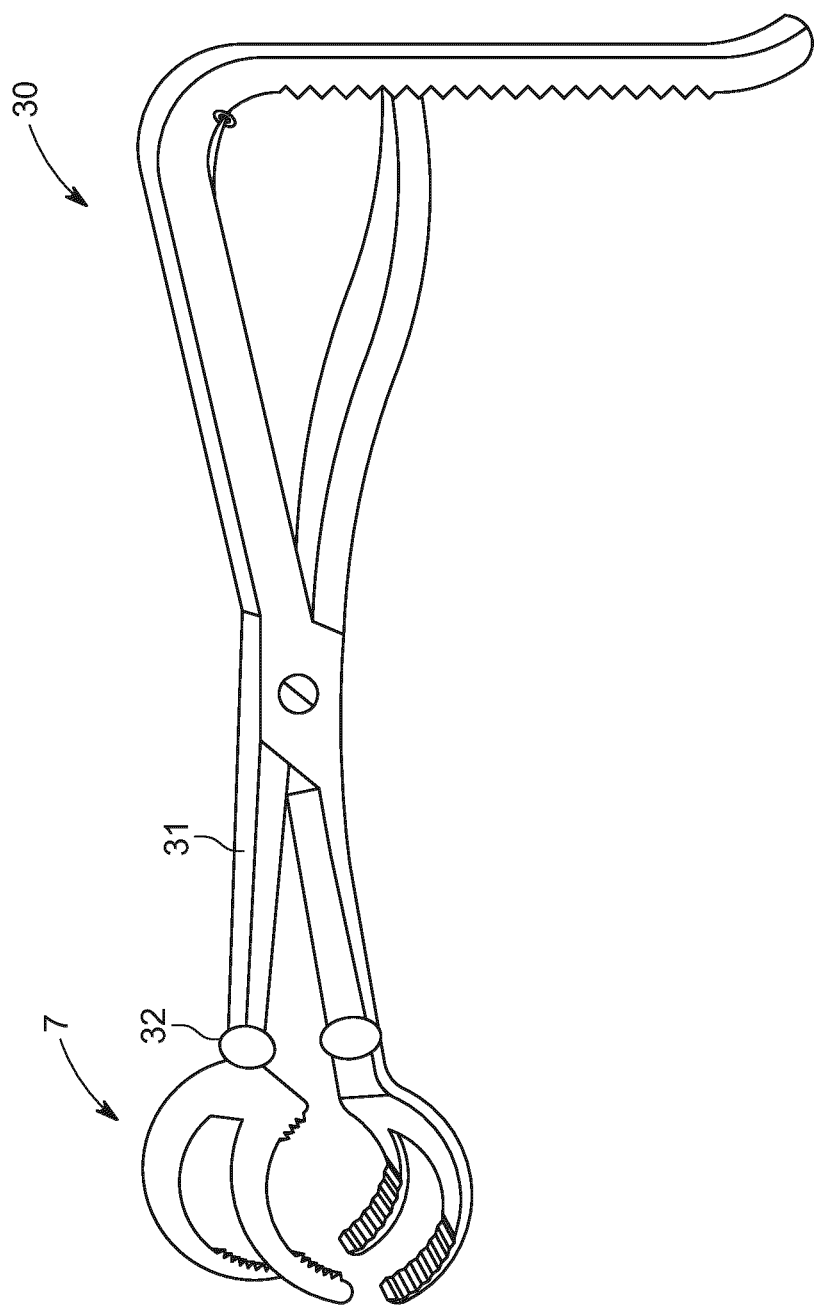
FIG. 10 is a perspective view of a bone reduction and plate fixation forceps according to the invention with a modular detachably attachable bifurcated distal end.
Figure 11:
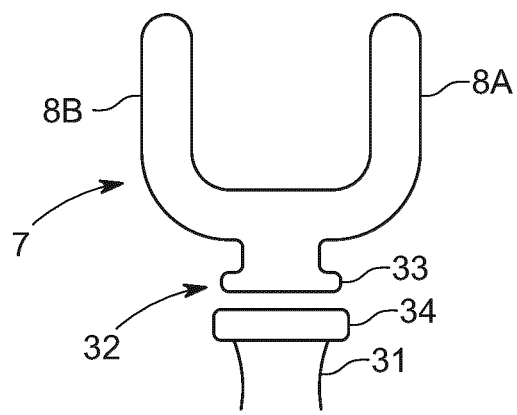
FIG. 11 is a plan view from above of the modular bifurcated distal end with rotational joint.
Figure 12:
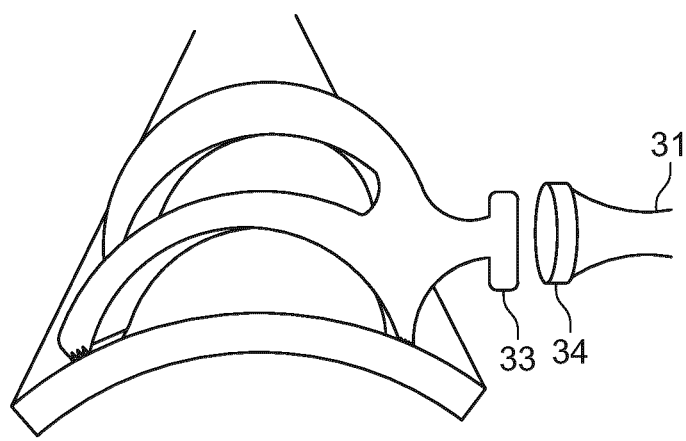
FIG. 12 is a side elevational view of the forceps and bifurcated distal end of FIGS. 10 and 11 shown attached to a bone.

FIGS. 10-12 are further illustrations of the detachable bifurcated part having a rotational hinge joint comprising a male part 33 on the bifurcated part configured for detachable engagement with a female part 34 on the shaft 31.

Figure 13:
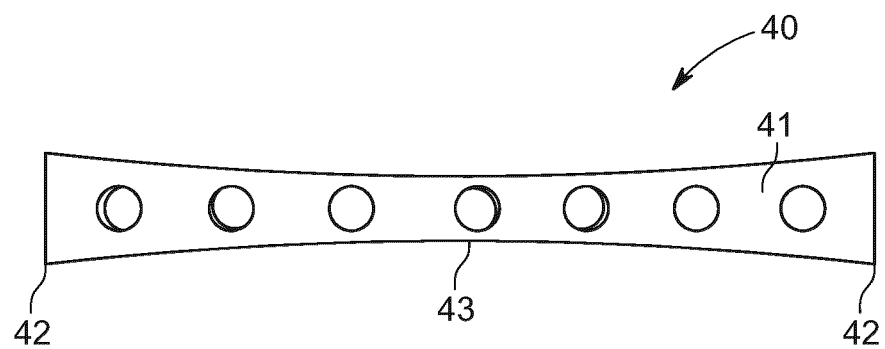
FIG. 13 is a top plan view of a tapered bone fixation plate according to the invention.

FIG. 13 illustrates a bone fixation plate according to the invention indicated generally by the reference numeral 40. The plate is an elongated plate with a superior surface 41 and an anterior surface (not shown) with ends 42 and an inwardly-tapering central section 43 disposed between the ends. The ends of the plate have a width of about 15 mm and the inwardly tapered section has a width at its narrowest section of about 12 mm. The inwardly tapered section extends along about one half of the length of the plate and has a maximum width of 14 mm along at least one third of the length of the plate.

Figure 14:
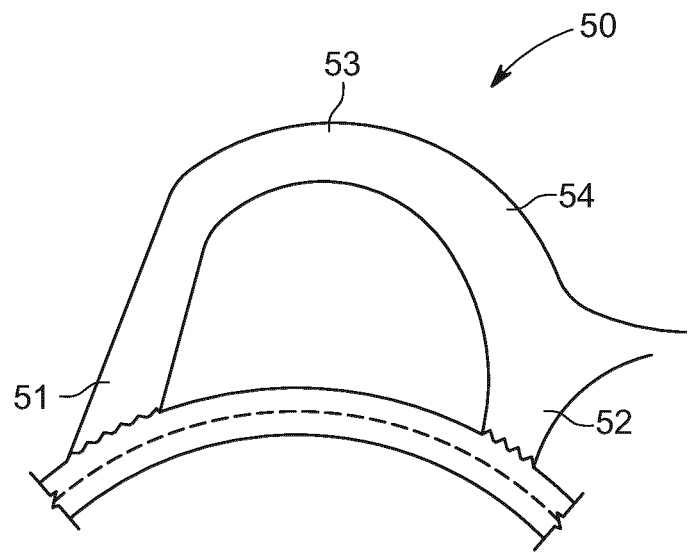
FIG. 14 is a sectional side elevational view of the a jaw forming part of a forceps according to one aspect of the invention in which the distance between the jaw parts is equal to the width of the ends of the plate of FIG. 13 (15 mm) and greater than the width of the inwardly tapered part of the plate (12 mm) and the distance between the jaw part and the bridging part of the jaw (18 mm) is greater than the width of the ends of the plate (15 mm).

FIG. 14 illustrates a jaw of a forceps according to an alternative embodiment of the invention, indicated generally by the reference numeral 50. Forceps including this type of jaw are configured for use with the tapered plate of FIG. 13. The jaw 50 has a distal jaw part 51 and proximal jaw part 52 separated by a distance of 15 mm as illustrated. The bridging part 53 of the jaw is higher than jaws described previously and has a dimension between the jaw part 51 and a side 54 of the bridging part 53 of 18 mm. In this way, the plate 40 cannot be passed under the jaw while it is flush to the plate, and has to be tilted upwardly to fit. Once the leading end 42 of the plate 40 has passed under both jaws and the jaws are aligned with the inwardly tapered central section 43 of the plate 40, the plate can be lowered to abut the plate where the inwardly tapered section fits between the jaw parts 51 and 52. This embodiment allows the ends of the plate to be wider than otherwise allowed by the jaw configuration, allowing more secure fitting of the ends of the plate to the bone.

FIGS. 15 and 16 show a conventional plate 20 and a tapered plate 40 according to the invention.

The forceps of the invention may be employed to hold bone fragments in a reduced position while a bone fixation plate is fixed to the bone. It is particularly applicable for use with transverse fractures of long bones, for example the humerus, femur, radius, ulna, metacarpals and metatarsals. It is also particularly applicable for fractures in the diaphysis of long bones.

The embodiments illustrated show a 4-point forceps (each arm is bifurcated and bears two bone-engaging jaws). However, it will be appreciated that the second arm does not have to be bifurcated and may bear a single elongated bone-engaging jaw configured to engage a bone across the fracture (i.e. a 3-point forceps). Moreover, it will be appreciated that the first arm may includes one, two or more bridge-shaped jaws. At least two bridge-shaped jaws is preferable.

FIGS. 17 to 20 illustrate a further embodiment of a bone reduction and plate fixation forceps is described, indicated generally by the reference numeral 60, in which parts described with reference to the previous embodiments are assigned the same reference numerals. The forceps comprises a first arm 2, second arm 3, and a pivot joint 4 providing pivoting scissors-like articulation of the arms. The pivot joint 4 is a conventional pivot joint used in orthopaedic forceps and will not be described in more detail.

Figure 17:
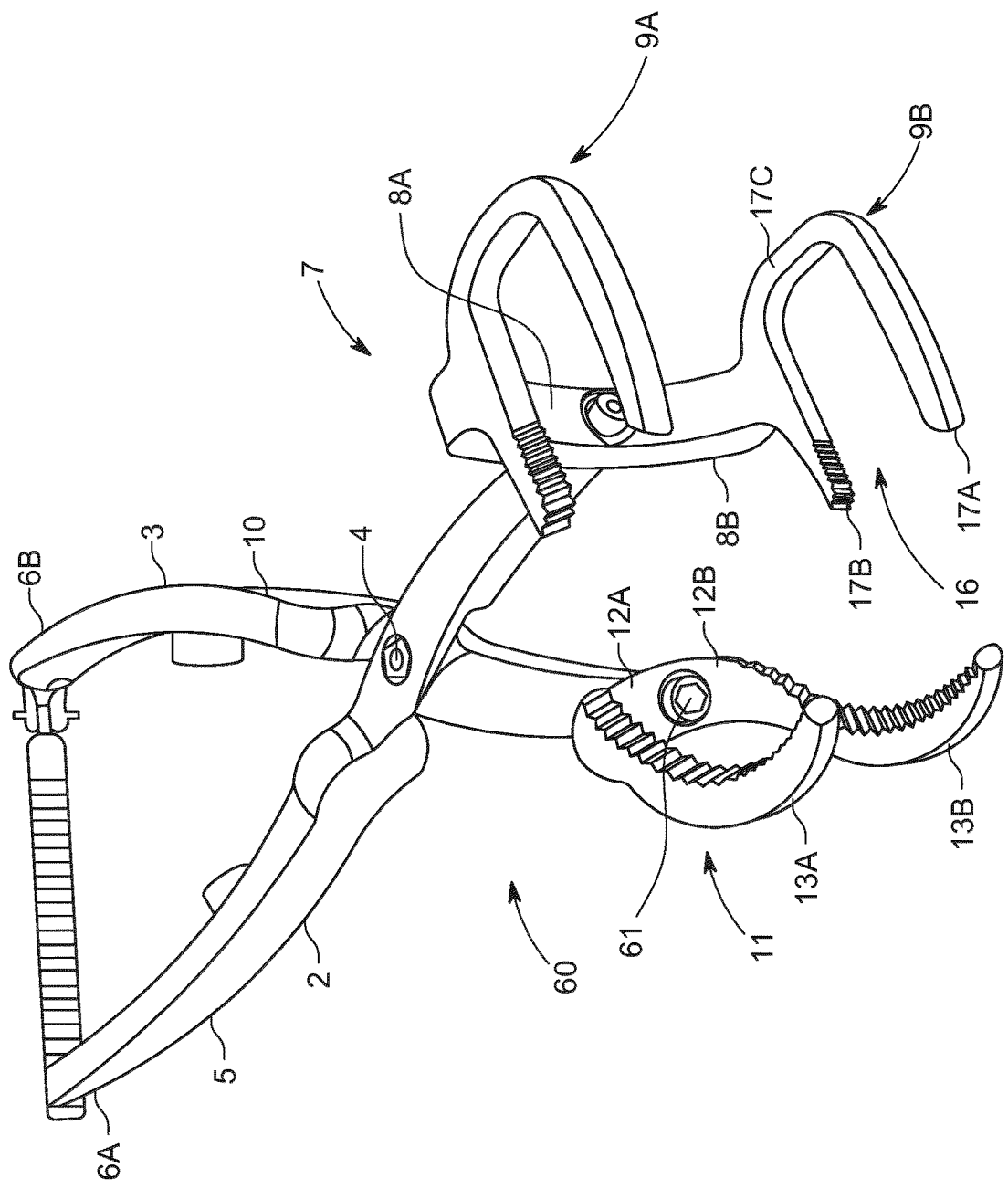
FIG. 17 is a perspective view of a bone reduction and plate fixation forceps according to an alternative embodiment of the invention.

The first arm 2 has a proximal section 5 with a handle 6A and a bifurcated distal end 7 with diverging fork parts 8A, 8B each terminated in an n-shaped bone engaging jaw 9A, 9B. As shown in FIG. 17, the fork parts 8A, 8B diverge at a right angle to an axis of the proximal section of the first arm. In use, the jaws 9A, 9B are used to grasp a first surface 14 of a fractured bone on each side of a fracture (as illustrated in FIG. 3). In the embodiment shown, the jaws 9A, 9B are laterally spaced apart by about 6 cm, although it will be appreciated that the spacing may be varied according to the bone being treated and the type of fracture.

Figure 18:
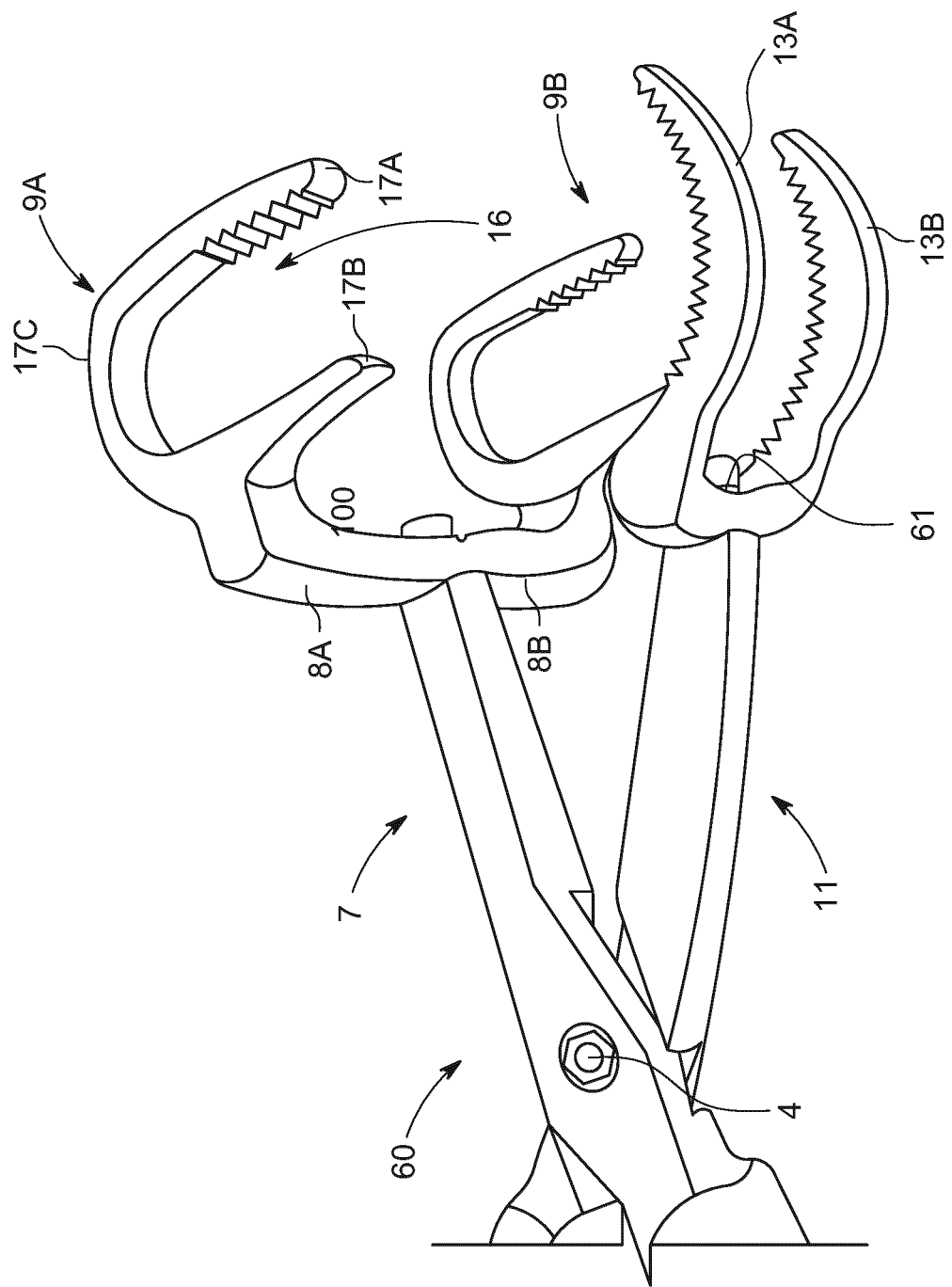
FIG. 18 is a perspective view of a distal end of the bone reduction and plate fixation forceps of FIG. 17.
Figure 19:
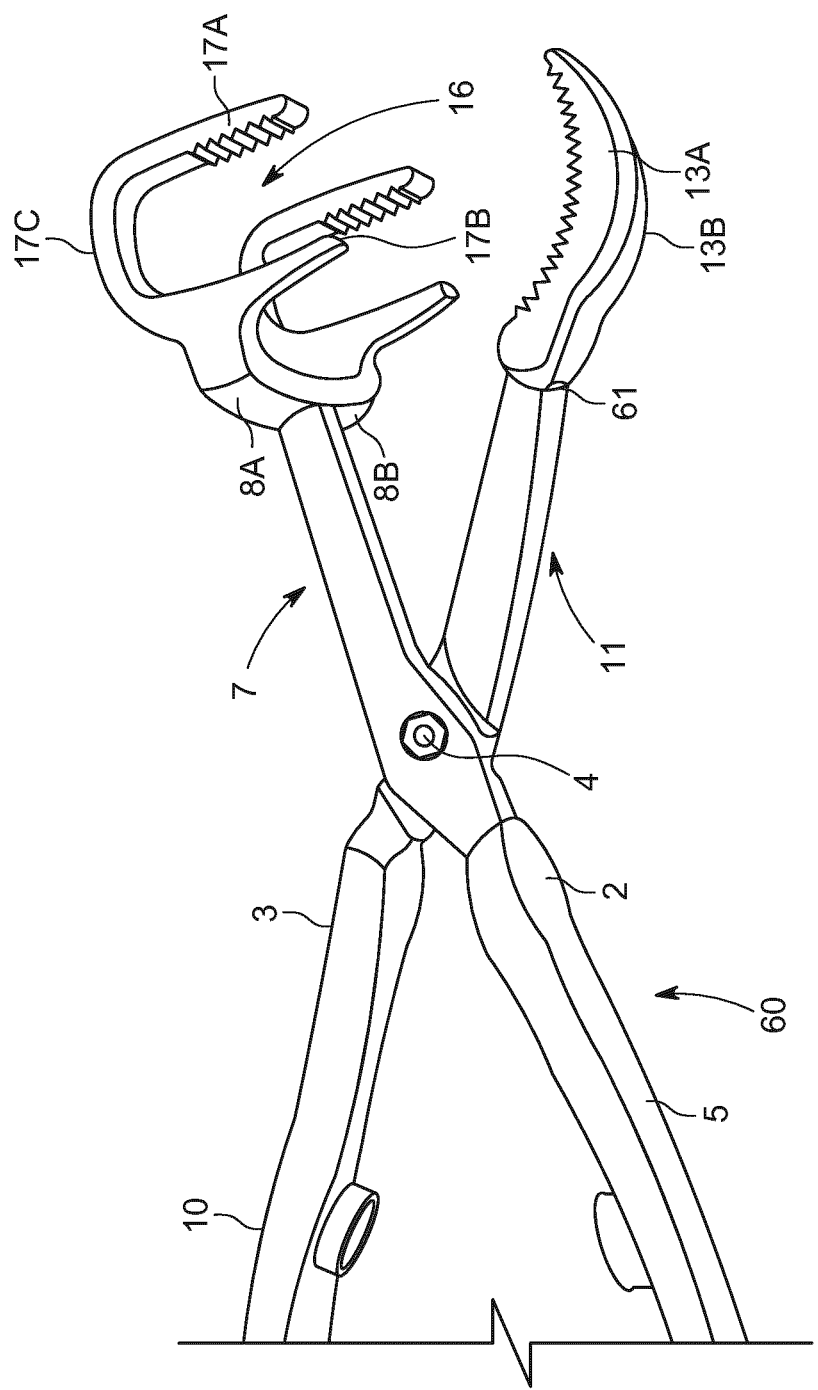
FIG. 19 is a further perspective view of the bone reduction and plate fixation forceps of FIG. 17.
Figure 20:
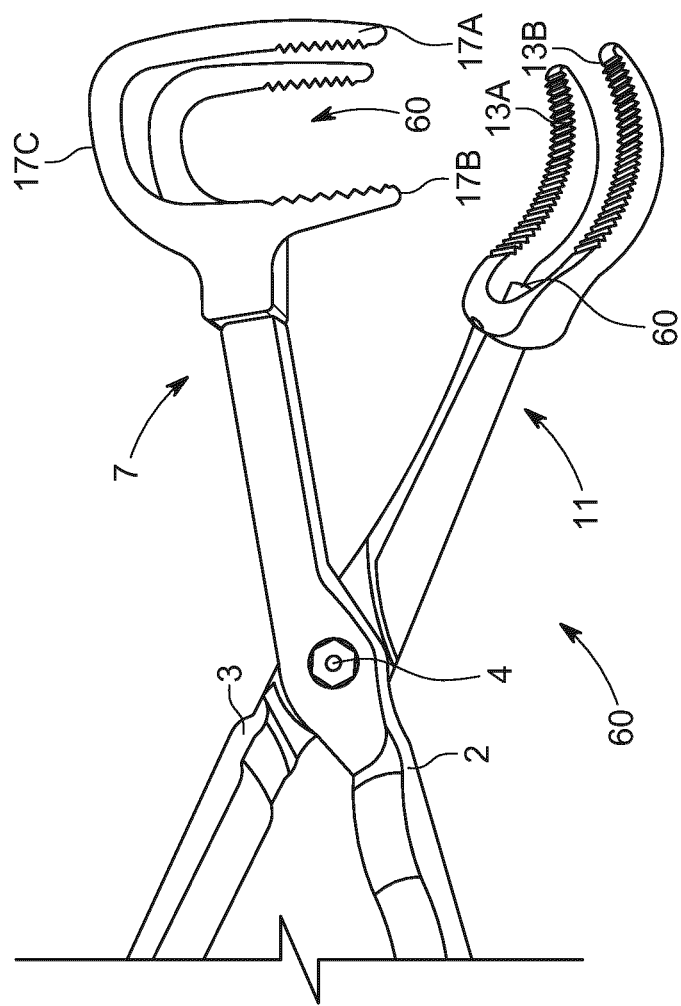
FIG. 20 is a side elevational view of a distal end of the bone reduction and plate fixation forceps of FIG. 17.

The second arm 3 has a proximal section 10 with a handle 6B and a bifurcated distal end 11 with diverging forks parts 12A, 12B each terminated in a bone engaging jaw 13A, 13B. As shown in FIGS. 17 and 18, the fork parts 12A, 12B diverge at a right angle to an axis of the proximal section of the second arm. The distal end 11 comprises a rotational joint 61 allowing the bifurcated distal end 11 a degree of rotation about an axis of the second arm 3. In use, the jaws 13A, 13B are used to grasp a second surface 18 of a fractured bone on each side of a fracture 19 (as illustrated in FIG. 3). In the embodiment shown, the jaws 13A, 13B are laterally spaced apart by about 3 cm, although it will be appreciated that the spacing may be varied according to the bone being treated and the type of fracture.

Referring to FIGS. 4 to 5, the bone engaging jaws 9A, 9B of the first arm 2 are described in more detail. As illustrated best in the sectional view of FIG. 4, the jaws have a distal to proximal (right to left in FIG. 4) bridge shape configured to grip the bone at spaced apart points across the first surface providing a recess 16 to receive a bone fixation plate when the jaws are engaged with the bone. The bridge shaped jaw comprises a distal jaw part 17A, a proximal jaw part 17B and an arcuate bridging jaw part 17C that define (along with the first surface of the bone during use) the plate-receiving recess 16. In the embodiment shown, the bridge-shaped jaw is configured such that during use the distal and proximal jaw parts are circumferentially spaced around the top surface at an angle θ of about 80° as shown in FIG. 4. In the embodiment shown, the recess has a height of about 4 cm.

EQUIVALENTS

The foregoing description details presently preferred embodiments of the present invention. Numerous modifications and variations in practice thereof are expected to occur to those skilled in the art upon consideration of these descriptions. Those modifications and variations are intended to be encompassed within the claims appended hereto.

The invention claimd is:

1. A bone reduction and plate fixation kit, comprising:
   a bone reduction and plate fixation forceps, comprising:

a first arm having a proximal part comprising a handle and a bifurcated distal part having a first fork with a first bone engaging jaw and a second fork with a second bone engaging jaw in which the first bone engaging jaw and second bone engaging jaw are configured to engage a first surface of a fractured bone on each side of a fracture; and a second arm having a proximal part comprising a handle and a distal part comprising a third bone engaging jaw configured to engage a second surface of the fractured bone to clamp the bone between the first and second arm;

wherein the second arm is pivotally attached to the first arm by a first joint disposed between the respective handles and the respective bone-engaging jaws of the first and second arms, characterized in that at least one of the first bone engaging jaw and second bone engaging jaw comprises a distal bone engaging jaw part connected to a proximal bone engaging jaw part by a raised bridging jaw part that defines a bone fixation plate receiving recess, and wherein the first bone engaging jaw and second bone engaging jaw are spaced apart by a distance of 4 to 8 cm; and a bone fixation plate configured for passage under at least one of the first bone engaging jaw and second bone engaging jaw of the bone reduction and plate fixation forceps when the jaw is engaged with the fractured bone, wherein the plate has an inwardly tapered central section intermediate its ends in a longitudinal aspect, and wherein the distal bone engaging jaw part and proximal bone engaging jaw part are spaced apart by a distance X, wherein the ends of plate have a width that is equal to or greater than X and the inwardly tapered central section of the plate has a width that is less than X, whereby the plate is required to be tilted upwardly to allow passage of an end of the plate under the raised bridging jaw part, whereby the inwardly tapered central section of the plate can fit between the jaw parts when flush against the bone.

2. The bone reduction and plate fixation forceps according to claim 1, wherein the distal part of the first or second arm includes a joint allowing rotational movement of a distal end of the distal part about an axis of the distal part of the arm.

3. The bone reduction and plate fixation forceps according to claim 1, in which both the first bone engaging jaw and second bone engaging jaw comprises a distal bone engaging jaw part connected to a proximal bone engaging jaw part by a raised bridging jaw part that defines a bone fixation plate receiving recess.

4. The bone reduction and plate fixation forceps according to claim 1, in which the distal part of the second arm is bifurcated and comprises a third fork comprising the third bone engaging jaw and a fourth fork comprising a fourth bone engaging jaw, in which the third bone engaging jaw and fourth bone engaging jaw are configured to engage the second surface of the fractured bone on each side of the fracture.

5. The bone reduction and plate fixation forceps according to claim 1, in which the first bone engaging jaw and second bone engaging jaw are laterally spaced apart by a first distance D1 and the third bone engaging jaw and fourth bone engaging jaw are laterally spaced apart by a second distance D2, wherein D1 is at least 50% greater than D2.

6. The bone reduction and plate fixation forceps according to claim 4, in which the third bone engaging jaw and fourth bone engaging jaw are laterally spaced apart by a second distance D2, in which D2 is from 2-4 cm.

7. The bone reduction and plate fixation forceps according to claim 1, in which the first bone engaging jaw and second bone engaging jaw are laterally spaced apart by a first distance D1, in which D1 is from 5-7 cm.

8. The bone reduction and plate fixation forceps according to claim 1, in which the first and/or second bone engaging jaws have an arcuate profile.

9. The bone reduction and plate fixation forceps according to claim 1, in which the distal and proximal bone engaging jaw parts are configured such that in use they are circumferentially spaced apart around the first surface of the bone by about 50-120°.

10. The bone reduction and plate fixation forceps according to claim 1, in which the bone fixation plate receiving recess has a height of 2 to 7 cm.

11. The bone reduction and plate fixation forceps according to claim 1, in which the bone engaging jaws comprise a plurality of teeth; or the bone reduction and plate fixation forceps includes a ratcheting mechanism attached to one of the first and second arms.

12. The bone reduction and plate fixation forceps according to claim 1, wherein the distal part of the first or second arm includes a joint allowing rotational movement of a distal end of the distal part about an axis of the distal part of the arm, in which the rotational joint is disposed on the distal part of the arm just proximally of a point of bifurcation.

13. The bone reduction and plate fixation forceps according to claim 1, wherein the distal part of the first or second arm includes a joint allowing rotational movement of a distal end of the distal part about an axis of the distal part of the arm, in which the rotational joint is configured to limit rotation of the distal end of the distal part of the first or second arms about the axis of the distal part of the arm to 20°-100°.

14. The bone reduction and plate fixation forceps according to claim 1, wherein the distal part of the first or second arm includes a joint allowing rotational movement of a distal end of the distal part about an axis of the distal part of the arm, in which the rotational joint is configured to limit rotation of the distal end of the distal part of the first or second arms about the axis of the distal part of the arm to 50°-100°.

15. The bone reduction and plate fixation forceps according to claim 1, wherein the distal part of the first or second arm includes a joint allowing rotational movement of a distal end of the distal part about an axis of the distal part of the arm, in which the rotational joint is configured to allow detachable engagement of the bifurcated part of the distal part from the forceps.

16. The bone reduction and plate fixation kit according to claim 1, in which the bone fixation plate is a dynamic compression plate.

17. The bone reduction and plate fixation kit according to claim 1, in which the bone fixation plate is a transverse fracture bone fixation plate.

18. The bone reduction and plate fixation kit according to claim 1, in which the bone fixation plate has at least one end with a width of 14-16 mm and in which the inwardly tapered central section has a width of 11-13 mm.

* * * * *